(12) United States Patent
Kirkham

(10) Patent No.: US 7,481,441 B2
(45) Date of Patent: Jan. 27, 2009

(54) SLOTTED AXLE ASSEMBLY

(75) Inventor: David Kirkham, Springfield, MO (US)

(73) Assignee: Ridewell Corporation, Springfield, MO (US)

( * ) Notice: Subject to any disclaimer, the term of this patent is extended or adjusted under 35 U.S.C. 154(b) by 360 days.

(21) Appl. No.: 11/291,749

(22) Filed: Dec. 1, 2005

(65) Prior Publication Data

US 2007/0126198 A1    Jun. 7, 2007

(51) Int. Cl.
*B62D 7/18* (2006.01)
(52) U.S. Cl. ................................. 280/93.512
(58) Field of Classification Search ............ 280/93.512, 280/93.502, 124.1, 124.106, 124.166; 301/124.1
See application file for complete search history.

(56) References Cited

U.S. PATENT DOCUMENTS

| | | | | |
|---|---|---|---|---|
| 4,232,881 A | * | 11/1980 | Kolbel et al. | 280/124.128 |
| 4,623,164 A | * | 11/1986 | Cassel et al. | 280/124.106 |
| 5,326,128 A | * | 7/1994 | Cromley, Jr. | 280/656 |
| 5,409,255 A | * | 4/1995 | Alatalo et al. | 280/124.166 |
| 5,411,287 A | * | 5/1995 | Henschen | 280/124.169 |
| 5,464,243 A | * | 11/1995 | Maiwald et al. | 280/638 |
| 6,116,626 A | * | 9/2000 | Cherry et al. | 280/124.135 |
| 6,416,136 B1 | * | 7/2002 | Smith | 301/128 |
| 6,758,535 B2 | * | 7/2004 | Smith | 301/128 |
| 6,808,189 B1 | * | 10/2004 | Schlosser et al. | 280/93.512 |
| 6,902,176 B2 | * | 6/2005 | Gottschalk | 280/93.512 |

* cited by examiner

*Primary Examiner*—Faye M. Fleming
(74) *Attorney, Agent, or Firm*—Lathrop & Gage L.C.

(57) ABSTRACT

Provided is a slotted axle assembly for a vehicle suspension system. The slotted axle assembly includes an axle beam extending laterally between two axle connectors. Each axle connector is slotted for mating with an end of the axle beam. When assembled, each end of the axle beam surrounds or encapsulates an axle connector. A kingpin housing is inserted into each axle connector for receiving and retaining a king pin. Also, a bottom plate is attached to the axle beam and the two axle connectors. The slotted axle assembly may include a plurality of brackets, braces and channels, to include one or more damper brackets, air spring mating channels, and control arm brackets. Components of the slotted axle assembly may be welded together, or an alternate method of mechanical fastening may be employed.

21 Claims, 2 Drawing Sheets

SLOTTED AXLE ASSEMBLY

BACKGROUND

One of the challenges associated with the manufacture of wheeled vehicles, especially large wheeled vehicles such as semi-trailer trucks and tractors, is the manufacture and assembly of an axle assembly for the suspension system. Structurally, there is a need to transition from the strength and stability of the axle to the moving mechanical components of the wheels and other suspension system components. There is also a need, however, to minimize the weight of the axle assembly, the complexity of the various components comprising the axle assembly, and the cost to manufacture and assemble the suspension system. Oftentimes, strength and stiffness are achieved at the expense of weight, cost, and/or ease of assembly.

In many prior art suspension systems, the axle assembly includes a single, continuous axle beam interconnecting one king pin housing to another. In some instances, the axle beam may actually include the king pin housing, and the entire axle beam-king pin housing assembly may be formed as a single component. A single, continuous axle assembly is often heavy and unwieldy, thereby making integration of such an assembly into the suspension system a challenging proposition. Additionally, manufacturing of the axle assembly itself is often difficult and costly.

Alternatively, many current axle assemblies include several distinct components interconnected to form a link between king pin housings, or to connect the axle to a pivot arm or other subassembly. In particular, the axle assembly may include an axle which interfaces at either end with an axle connector. Typically, the axle connector fits around the outside of the axle and is welded, press fit, or otherwise mechanically fastened in place. The structural strength and integrity of such a system is limited. Forces at the axle connector-axle interface tend to induce stresses, such as peel stresses, along the interface lines between the two components. These induced stresses may force the axle to separate from the axle connector, leading to a premature mechanical failure of the axle assembly.

The above prior art does not efficiently reduce weight, cost and manufacturing complexity; it also does not improve strength and performance while simultaneously simplifying the steps to assemble the suspension systems of the large wheeled vehicles.

SUMMARY

Provided is a slotted axle assembly for a vehicle suspension system. In particular, and by way of example only, according to an embodiment provided is a slotted axle assembly including: an axle beam having a first end and a second end; a first king pin housing; a second king pin housing; a first axle connector having a first end for receiving the first king pin housing and a slotted second end for mating with the first end of the axle beam; a second axle connector having a first end for receiving the second king pin housing and a slotted second end for mating with the second end of the axle beam; and a bottom plate attached to the axle beam, the first axle connector, and the second axle connector.

Further, in one embodiment a method for manufacturing a slotted axle assembly is provided, including: securing a first kingpin housing in a first end of a first axle connector; securing a second kingpin housing in a first end of a second axle connector; inserting a first end of an axle beam into a slotted second end of the first axle connector, to cover the second end of the first axle connector; inserting a second end of the axle beam into a slotted second end of the second axle connector, to cover the second end of the second axle connector; fastening the axle beam to the first and second axle connectors; and attaching a bottom plate to the axle beam and the first and second axle connectors.

Also, in one embodiment an improved axle assembly of the type having an axle beam, at least one king pin housing, and at least one axle connector positioned between the axle beam and the king pin housing is provided, the improvement including: a first axle connector having a first end for receiving a first king pin housing and a slotted second end for mating with a first end of the axle beam, wherein the first end of the axle beam substantially surrounds the slotted second end of the first axle connector; a second axle connector having a first end for receiving a second king pin housing and a slotted second end for mating with a second end of the axle beam, wherein the second end of the axle beam substantially surrounds the slotted second end of the second axle connector; and a bottom plate attached to the axle beam, the first axle connector, and the second axle connector.

DETAILED DESCRIPTION

Figure 1:
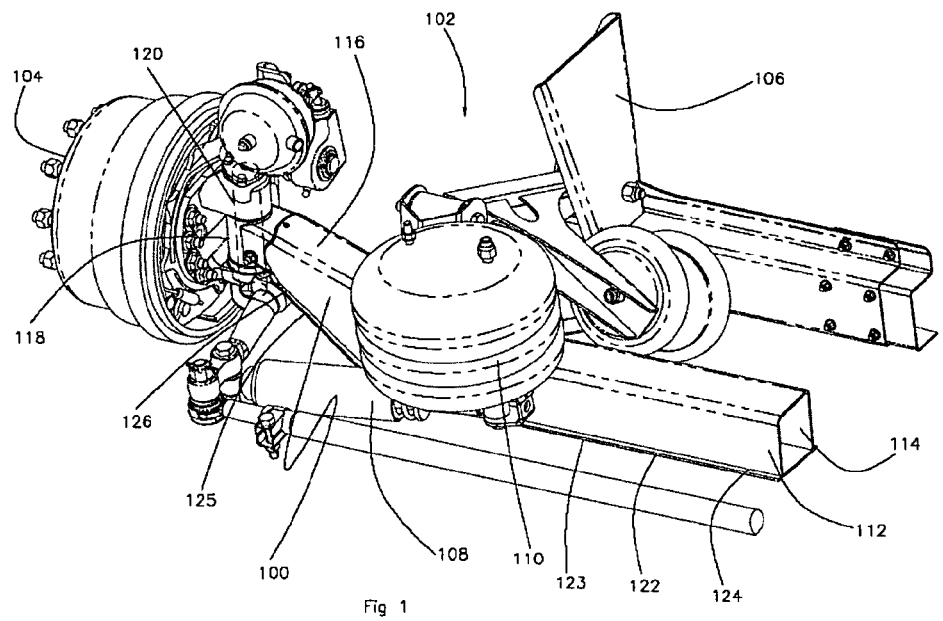
FIG. 1 is a perspective view of a portion of a vehicle suspension system to include a slotted axle assembly, according to an embodiment.

A slotted axle assembly 100 is shown in FIG. 1 as part of a vehicle suspension system 102. In general, the vehicle suspension system 102 may include a wheel subassembly 104, as well as one or more hanger brackets, e.g. hanger bracket 106. Hanger bracket 106, or similar mounting hardware, mounts vehicle suspension system 102 to the chassis of a vehicle (not shown). Also, vehicle suspension system 102 may include components such as dampers 108 and air bellows 110.

When slotted axle assembly 100 interfaces with wheel subassembly 104, it provides strength and stiffness necessary to support wheel assembly 104 during vehicle operations. It may further provide mounting and interface points for other vehicle suspension system 102 components such as air bellows 110.

With regard to slotted axle assembly 100, an axle beam 112 extends laterally for substantially the width of the vehicle. As shown, axle beam 112 may be rectangular in shape; however, the shape of axle beam 112 may vary depending on the particular vehicle suspension system 102 and vehicle type. For example, axle beam 112 may be a tube with an aperture 114 extending along the length of axle beam 112. Alternatively, axle beam 112 may be a C-shaped or U-shaped component with a center-section channel extending for the length of axle beam 112 (see FIG. 4).

Figure 2:
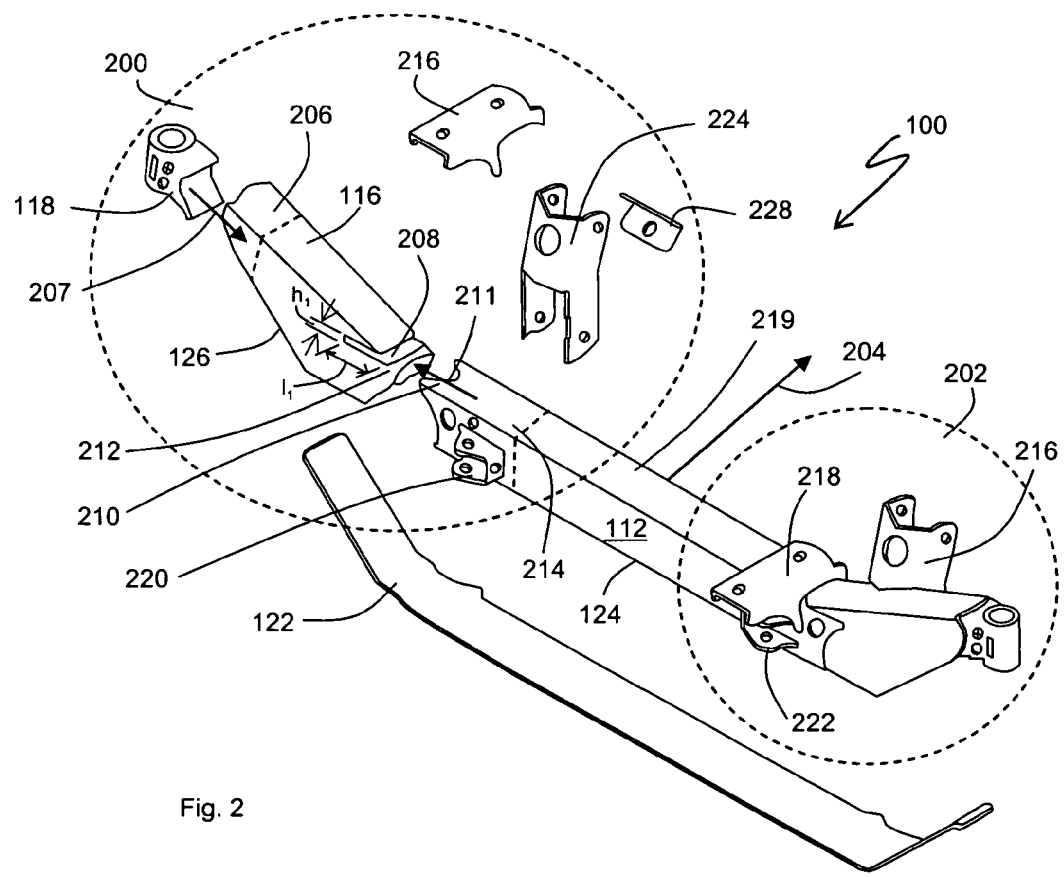
FIG. 2 is a partially exploded view of a slotted axle assembly, according to an embodiment.

As is discussed in greater detail below, axle beam 112 interfaces with an axle connector 116. Axle connector 116, in turn, interfaces with a king pin housing 118. King pin housing 118 receives and retains a king pin 120, thereby connecting wheel subassembly 104 to axle connector 116. A bottom plate 122 interfaces with, and is attached to, a bottom surface 124 of axle beam 112 and a bottom surface 126 of axle connector 116. Bottom plate 122 provides additional strength and stiffness to the combination of axle beam 112 and axle connector 116. Bottom plate 122 may be formed as a single piece to match the contour of axle beam 112 and axle connector 116 (as shown in FIG. 2). Alternatively, bottom plate 122 may consist of a plurality of plate sections, e.g. sections 123 and 125, individually attached to axle beam 112 and axle connector 116. The interconnection of components, such as bottom plate 122 to axle beam 112, is further shown in FIGS. 2 and 3 and discussed below.

Referring now to FIG. 2, slotted axle assembly 100 is shown in a partially exploded view. By convention, slotted axle assembly 100 may be referred to as having a left-hand side 200 and a right-hand side 202, relative to a forward portion (indicated by arrow 204) of the vehicle. It can be appreciated that left-hand side 200 and right-hand side 202 are substantially the same for the purposes of this disclosure. As can be seen, left-hand side 200 is shown in exploded view for clarity. When assembled, king pin housing 118 is inserted (as shown by arrow 207) into an aperture 206 of axle connector 116 and mechanically fastened to axle connector 116. Mechanical fastening of king pin housing 118 may include welding or other fastening techniques known in the art. In at least one embodiment, king pin housing 118 is removable, so that king pin housings of various sizes may be interchanged while using the same axle connector 116.

Axle connector 116 is manufactured with a slot 208 cut into the "axle beam" end of axle connector 116. During assembly, slot 208 engages or mates with an upper beam-end 210 of axle beam 112. The dimensions of slot 208, i.e. "$l_1$" and "$h_1$", are sufficient to allow upper beam-end 210 to be press-fit into position, maintaining a tight tolerance in the interface between axle beam 112-axle connector 116. When upper beam-end 210 mates with slot 208 (as shown by arrow 211), an end section 212 of axle connector 116 is positioned within aperture 214 of axle beam 116. As can be appreciated by referring to FIGS. 2-4, axle beam 112 fits around and substantially encapsulates end section 212 when the axle connector 116 and axle beam 112 are assembled. Once assembled, axle beam 112 is welded to axle connector 116 along outside weld lines (see FIG. 3). Further, axle beam 112 may be welded to axle connector 116 along weld lines inside the channel of a C-shaped or U-shaped axle beam 112 (see FIG. 4). In this configuration, with axle beam 112 substantially on the outside of axle connector 116 after assembly, the strength of the axle beam 112-axle connector 116 interface is highest at locations where the stresses on slotted axle assembly 100 may be greatest.

Still referring to FIG. 2, bottom plate 122 is shown as a contoured, single component that interfaces with bottom surfaces 124 and 126 of axle beam 112 and axle connector 116, respectively. Bottom plate 122 provides stiffness, strength and protection of bottom surfaces 124, 126. Further, bottom plate 122 may serve as a "close-out" of axle beam 112 when axle beam 112 is formed as a C-shaped or U-shaped component with a channel open toward bottom plate 122 (see FIG. 4). During the assembly process, bottom plate 122 is fastened to axle beam 112 and axle connector 116, typically by welding.

Brackets or other components may be mounted on, or otherwise attached to, axle beam 112 and axle connector 116. For example, a left-hand air spring mating channel 216 and a right-hand air spring mating channel 218 may be mounted to axle beam 112. Left-hand and right-hand air spring mating channels 216, 218 are typically mounted to a top surface 219 of axle beam 112. Further, damper brackets 220 and 222 may be mounted to axle beam 112 in close proximity to air spring mating channels 216 and 218. Illustratively, damper brackets 220 and 222 are for example positioned immediately below air spring mating channels 216 and 218, respectively A control arm bracket 224 may mount to axle connector 116 on left-hand side 200 of slotted axle assembly 100. Likewise, a control arm bracket 226 may mount to axle connector 116 on right-hand side 202. One or more control arm brackets, of which bracket 228 is exemplary, may be mounted to control arm brackets 224, 226. Further, slotted axle assembly 100 may include one or more steer lock brackets (not shown). Typically, the mounting of these and other components includes welding one component to another; however, other attachment techniques such as mechanical fasteners may be used in assembly.

Figure 3:
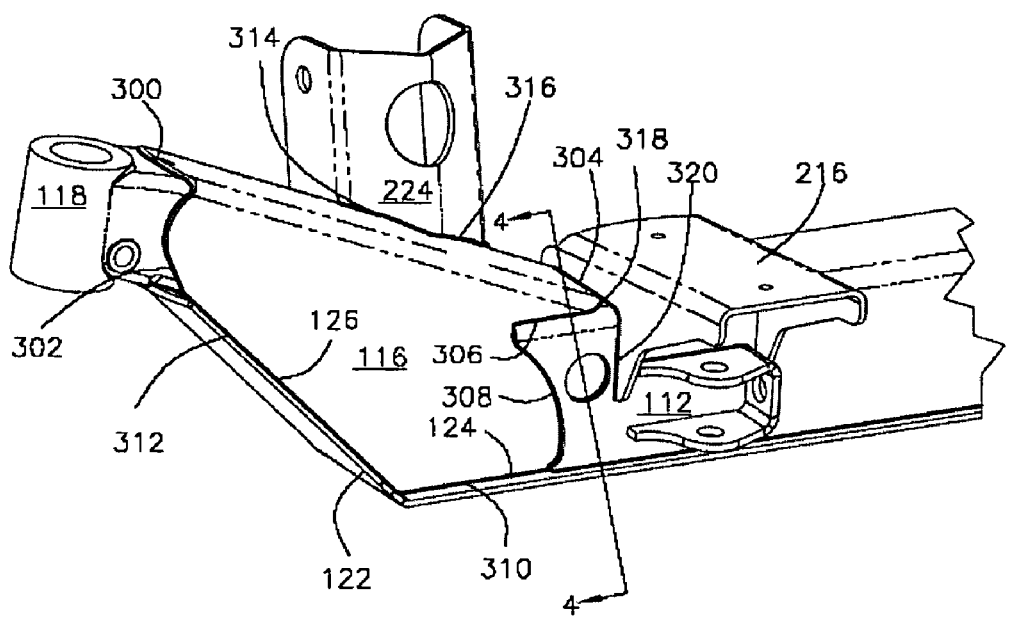
FIG. 3 is a perspective view a left-hand side of a slotted axle assembly, according to an embodiment.

Referring now to FIG. 3, a fully assembled left-hand side 200 of slotted axle assembly 100 is presented. Weld lines for fastening various components are shown as thick, dark lines. For example, weld lines 300 and 302 may be used to attach king pin housing 118 to axle connector 116. As shown, king pin housing 118 is permanently fastened to axle connector 116. However, in at least one embodiment king pin housing 118 is not welded and is therefore removable; in this configuration, an alternative approach known in the art is used to mechanically fasten king pin housing 118 to axle connector 116.

Axle connector 116 may be welded to axle beam 112 along exterior weld lines such as weld lines 304, 306 and 308. Further, bottom plate 122 is welded to bottom surfaces 124 and 126 along weld lines 310 and 312, respectively. Brackets, braces, channels, etc., may be welded in position as well. For example, control arm bracket 224 is shown welded along weld lines 314 and 316. Also, air spring mating channel 216 is welded to axle beam 112 along various weld lines, of which weld lines 318 and 320 are exemplary.

Figure 4:
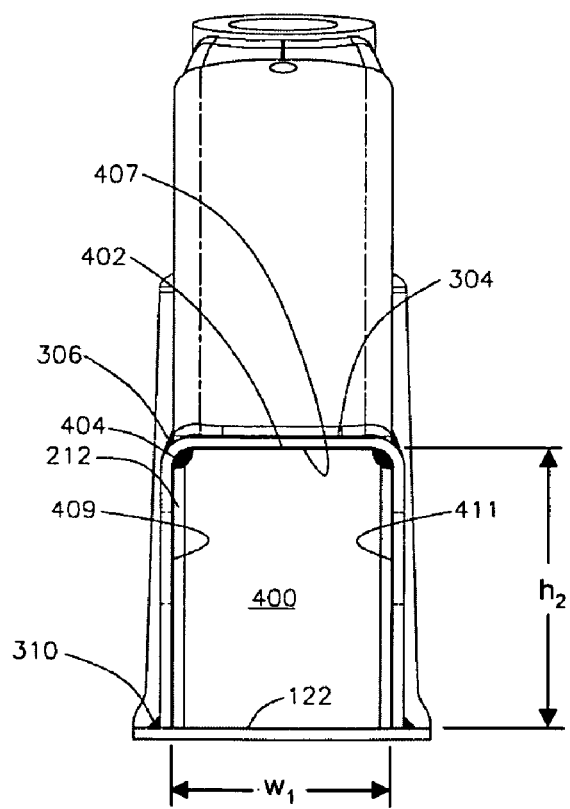
FIG. 4 is a partial cross-section view of an axle beam-axle connector interface, according to an embodiment.

In FIG. 4, a cross section of the axle beam 112-axle connector 116 interface is presented. As shown, the axle beam 112 is a U-shaped component having a center channel 400. The dimensions of channel 400, specifically "$w_1$" and "$h_2$", are slightly greater than the exterior dimensions of end section 212. End section 212 of axle connector 116 is positioned within channel 400, as axle beam 112 substantially encapsulates end section 212. In addition to exterior weld lines such as weld lines 304, 306 and 310, interior weld lines, of which weld lines 402 and 404 are exemplary, also aid in securing axle beam 112 to axle connector 116. During assembly, these components are welded together along inner surfaces 407, 409 and 411 of axle beam 112 prior to attaching bottom plate 122. Of note, the weld lines depicted in FIGS. 3 and 4 are representative of an approach for fastening various components of slotted axle assembly 100. It can be appreciated by the skilled artisan that other weld locations and welding techniques, as well as other mechanical fastening techniques, may be used to connect various components without departing from the scope of the present disclosure. Once assembled, the encapsulation and fastening of axle connector 116 to axle beam 112 provides a strong, stiff slotted axle assembly 100 capable of withstanding loads associated with vehicle movement and use.

Changes may be made in the above methods, devices and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, device and structure, which, as a matter of language, might be said to fall therebetween.

What is claimed is:

1. A slotted axle assembly, comprising:
   an axle beam having a first end and a second end;
   a first king pin housing;
   a second king pin housing;
   a first axle connector having a first end for receiving the first king pin housing and a slotted second end for mating with the first end of the axle beam;
   a second axle connector having a first end for receiving the second king pin housing and a slotted second end for mating with the second end of the axle beam; and
   a bottom plate attached to the axle beam, the first axle connector, and the second axle connector.

2. The slotted axle assembly of claim 1, wherein the axle beam is a tube having a center aperture extending for a length of the axle beam.

3. The slotted axle assembly of claim 1, wherein the axle beam comprises:
   a first wall having a first length;
   a second wall positioned parallel to the first wall and having a second length equal to the first length; and
   a third wall oriented substantially normal to the first wall and to the second wall and interconnecting the first wall and the second wall to form a channel therebetween.

4. The slotted axle assembly of claim 3, wherein the first axle connector is welded to an inner surface of the first end of the axle beam, and wherein the second axle connector is welded to an inner surface of the second end of the axle beam.

5. The slotted axle assembly of claim 1, wherein the bottom plate is welded to the axle beam, the first axle connector and the second axle connectors.

6. The slotted axle assembly of claim 1, wherein at least one king pin housing is removable.

7. A slotted axle assembly, comprising:
   an axle beam having a first end and a second end;
   a first king pin housing;
   a second king pin housing;
   a first axle connector having a first end for receiving the first king pin housing and a slotted second end for mating with the first end of the axle beam;
   a second axle connector having a first end for receiving the second king pin housing and a slotted second end for mating with the second end of the axle beam; and
   a bottom plate attached to the axle beam, the first axle connector, and the second axle connector;
   at least one damper bracket;
   a first air spring mating channel positioned at the first end of the axle beam;
   a second air spring mating channel positioned at the second end of the axle beam;
   a first control arm bracket positioned in close proximity to the first air spring mating channel; and
   a second control arm bracket positioned in close proximity to the second air spring mating channel.

8. A method for manufacturing a slotted axle assembly, comprising:
   securing a first kingpin housing in a first end of a first axle connector;
   securing a second kingpin housing in a first end of a second axle connector;
   inserting a first end of an axle beam into a slotted second end of the first axle connector, to cover the second end of the first axle connector;
   inserting a second end of the axle beam into a slotted second end of the second axle connector, to cover the second end of the second axle connector;
   fastening the axle beam to the first and second axle connectors; and
   attaching a bottom plate to the axle beam and the first and second axle connectors.

9. The method of claim 8, wherein securing further comprises welding the first and second king pin housings to the first and second axle connectors respectively.

10. The method of claim 8, wherein securing further comprises attaching the first and the second king pin housings with removable mechanical fasteners, wherein the king pin housings are removable.

11. The method of claim 8, wherein fastening further comprises welding the axle beam to the first and the second axle connectors.

12. The method of claim 8, wherein attaching further comprises welding the bottom plate to the axle beam, the first axle connector, and the second axle connector.

13. A method for manufacturing a slotted axle assembly, comprising:
   securing a first kingpin housing in a first end of a first axle connector;
   securing a second kingpin housing in a first end of a second axle connector;
   inserting a first end of an axle beam into a slotted second end of the first axle connector, to cover the second end of the first axle connector;
   inserting a second end of the axle beam into a slotted second end of the second axle connector, to cover the second end of the second axle connector;
   fastening the axle beam to the first and second axle connectors;
   attaching a bottom plate to the axle beam and the first and second axle connectors;
   mounting at least one damper bracket to the axle beam;
   positioning a first air spring mating channel at the first end of the axle beam;
   positioning a second air spring mating channel at the second end of the axle beam;
   attaching a first control arm bracket to the first axle connector in close proximity to the first air spring mating channel for attachment to a first control arm tower brace; and
   attaching a second control arm bracket to the second axle connector in close proximity to the second air spring mating channel for attachment to a second control arm tower brace.

14. An improved axle assembly of the type having an axle beam, at least one king pin housing, and at least one axle connector positioned between the axle beam and the king pin housing, the improvement comprising:
   a first axle connector having a first end for receiving a first king pin housing and a slotted second end for mating with a first end of the axle beam, wherein the first end of the axle beam substantially surrounds the slotted second end of the first axle connector;
   a second axle connector having a first end for receiving a second king pin housing and a slotted second end for mating with a second end of the axle beam, wherein the second end of the axle beam substantially surrounds the slotted second end of the second axle connector; and
   a bottom plate attached to the axle beam, the first axle connector, and the second axle connector.

15. The improved axle assembly of claim 14, wherein the axle beam is tubular shaped having a center aperture extending for a length of the axle beam.

16. The improved axle assembly of claim 14, wherein the axle beam comprises:

a first wall having a first length;

a second wall positioned parallel to the first wall and having a second length equal to the first length; and a third wall oriented substantially normal to the first wall and to the second wall and interconnecting the first wall and the second wall to form a channel therebetween.

17. The improved axle assembly of claim 14, wherein at least one king pin housing is removable.

18. A slotted axle assembly, comprising:

an axle beam having a first end, a second end, an upper wall, a second wall extending from the upper wall, and a third wall;

a first king pin housing;

a second king pin housing;

a first axle connector having a first end for receiving the first king pin housing and a second end for mating with the first end of the axle beam, the first axle connector second end having a slot extending in a direction in line with the axle beam upper wall;

a second axle connector having a first end for receiving the second king pin housing and a second end for mating with the second end of the axle beam, the second axle connector second end having a slot extending in a direction in line with the axle beam upper wall; and a bottom plate attached to the axle beam, the first axle connector, and the second axle connector;

wherein a portion of the axle beam upper wall is located in the first axle connector slot and sandwiched by the first axle connector;

wherein another portion of the axle beam upper wall is located in the second axle connector slot and sandwiched by the second axle connector;

wherein a portion of the first axle connector is engulfed by segments of: the axle beam upper wall, the axle beam second wall, and the axle beam third wall; and wherein a portion of the second axle connector is engulfed by other segments of: the axle beam upper wall, the axle beam second wall, and the axle beam third wall.

19. The slotted axle assembly of claim 18, wherein:

the second wall is generally perpendicular to the upper wall; and the third wall extends: (a) from the upper wall generally perpendicular to the upper wall;

or (b) from the second wall generally perpendicular to the second wall.

20. A slotted axle assembly, comprising:

an axle beam having a first end, a second end, an upper wall, a second wall extending from the upper wall, and a third wall; the upper wall, the second wall, and the third wall defining an interior area;

a first king pin housing;

a second king pin housing;

a first axle connector having a first end for receiving the first king pin housing and a second end for mating with the first end of the axle beam, the first axle connector second end having generally parallel opposed walls defining a slot extending in a direction in line with the axle beam upper wall;

a second axle connector having a first end for receiving the second king pin housing and a second end for mating with the second end of the axle beam, the second axle connector second end having generally parallel opposed walls defining a slot extending in a direction in line with the axle beam upper wall; and a bottom plate attached to the axle beam, the first axle connector, and the second axle connector;

wherein a portion of the axle beam upper wall is located in the first axle connector slot and sandwiched by the opposed walls of the first axle connector;

wherein another portion of the axle beam upper wall is located in the second axle connector slot and sandwiched by the opposed walls of the second axle connector;

wherein a portion of the first axle connector is inside the axle beam interior area; and wherein a portion of the second axle connector is inside the axle beam interior area.

21. The slotted axle assembly of claim 20, wherein:

the second wall is generally perpendicular to the upper wall; and the third wall extends: (a) from the upper wall generally perpendicular to the upper wall;

or (b) from the second wall generally perpendicular to the second wall.

* * * * *